US010902350B2

(12) United States Patent
Banerjee et al.

(10) Patent No.: US 10,902,350 B2
(45) Date of Patent: Jan. 26, 2021

(54) SYSTEM AND METHOD FOR RELATIONSHIP IDENTIFICATION

(71) Applicant: Oath Inc., New York, NY (US)

(72) Inventors: Siddhartha Banerjee, Sunnyvale, CA (US); Kostas Tsioutsiouliklis, San Jose, CA (US)

(73) Assignee: Verizon Media Inc., New York, NY (US)

( * ) Notice: Subject to any disclaimer, the term of this patent is extended or adjusted under 35 U.S.C. 154(b) by 250 days.

(21) Appl. No.: 16/041,073

(22) Filed: Jul. 20, 2018

(65) Prior Publication Data

US 2020/0027034 A1    Jan. 23, 2020

(51) Int. Cl.
*G06F 40/30* (2020.01)
*G06N 20/00* (2019.01)
*G06F 40/253* (2020.01)
*G06F 40/295* (2020.01)

(52) U.S. Cl.
CPC .......... *G06N 20/00* (2019.01); *G06F 40/253* (2020.01); *G06F 40/295* (2020.01); *G06F 40/30* (2020.01)

(58) Field of Classification Search
CPC . G06N 99/005; G06F 17/274; G06F 17/2785; G06F 17/278; G06F 40/205; G06F 40/284; G06F 40/30; G06F 40/00; G06F 40/253; G06F 40/216
See application file for complete search history.

(56) References Cited

U.S. PATENT DOCUMENTS

| 10,049,103 | B2 * | 8/2018 | Perez | G10L 25/30 |
| 2008/0221878 | A1 * | 9/2008 | Collobert | G06F 40/30 704/232 |
| 2011/0270604 | A1 * | 11/2011 | Qi | G06F 16/3344 704/9 |
| 2017/0358295 | A1 * | 12/2017 | Roux | G06F 40/40 |
| 2018/0121787 | A1 * | 5/2018 | Hashimoto | G06N 3/04 |
| 2018/0121788 | A1 * | 5/2018 | Hashimoto | G06F 40/284 |
| 2018/0121799 | A1 * | 5/2018 | Hashimoto | G06F 40/216 |
| 2018/0329883 | A1 * | 11/2018 | Leidner | G06F 16/2237 |
| 2018/0336183 | A1 * | 11/2018 | Lee | G06F 40/30 |

OTHER PUBLICATIONS

S. Banerjee and K. Tsioutsiouliklis, "Relation Extraction Using Multi-Encoder LSTM Network on a Distant Supervised Dataset," 2018 IEEE 12th International Conference on Semantic Computing (ICSC), Laguna Hills, CA, 2018, pp. 235-238. (Year: 2018).*
S. P. Singh, A. Kumar, A. Lohan, J. Chaudhary and P. Daksh, "Hybrid POS Classification Using Long Short Term Memory," 2018 3rd IEEE International Conference on Recent Trends in Electronics, Information & Communication Technology (RTEICT), Bangalore, India, 2018, pp. 2556-2561. (Year: 2018).*

(Continued)

*Primary Examiner* — Edgar X Guerra-Erazo
(74) *Attorney, Agent, or Firm* — Pillsbury Winthrop Shaw Pittman LLP

(57) ABSTRACT

The present teaching relates to method, system, and medium for generating training data for generating a relationship identification model. Sentences are received as input. Each of the sentences is aligned with a fact previously stored to create an alignment. Confidence scores for the alignments are computed and then used, together with the alignments to train a relationship identification model.

20 Claims, 17 Drawing Sheets

(56) References Cited

OTHER PUBLICATIONS

M. Ahmed, M. R. Samee and R. Mercer, "Improving Neural Sequence Labelling Using Additional Linguistic Information," 2018 17th IEEE International Conference on Machine Learning and Applications (ICMLA), Orlando, FL, 2018, pp. 650-657. (Year: 2018).*

Rei, M. (2017). Semi-supervised multitask learning for sequence labeling. (Year: 2017).*

* cited by examiner

SYSTEM AND METHOD FOR RELATIONSHIP IDENTIFICATION

BACKGROUND

1. Technical Field

The present teaching generally relates to data processing. More specifically, the present teaching relates to identifying relationships from text data.

2. Technical Background

In the age of the Internet, amount of data available becomes explosive. Great effort has been made to analyze the vast amount of data to make some sense out of it in order to improve the efficiency associated with data access. For example, some attempts have been made to identify relationships expressed or implied by textual information. Such identified relationships may help users to quickly access relevant information they are interested in. For instance, there are many sentences in online content indicating who was born in London in 1945. In this case, "was born in 1945" is a relationship between a person who was born in London and city London. With a correct identification of all sentences that has this relationship, it is efficient to get a list of people who were born in 1945 in London or further compute the statistics on how many people were born in 1945 in London.

To automatically detect various relationships from text data, conventionally a model is trained based on data that have been labeled with such relationships. This is illustrated in FIG. 1A (PRIOR ART), in which a training data collection mechanism 110 collects textual data and sends to a ground truth labeling unit 120 for labeling the data with different relationships. Such labeled training data are then stored in a labeled training data storage 130, which are then used by a training mechanism 140 as training data to generate a model (not shown) for recognizing relationships from data. The quality of correctly identifying relationships from text data depends on the quality of the model, while quality of the model depends on the quality of the labeled data and the amount thereof.

With this conventional approach, ground truth data labeling may be manual or automated. As the process of manually labeling training data is extremely inefficient, partial automated approach has been developed. FIG. 1B (PRIOR ART) illustrates a typical semi-automated approach in generating training data for training a model for identifying relationships from textual data. An alignment unit 150 receives sentences as input and then aligns each sentence with a fact previously stored in a fact database 160. The facts in storage 160 are stored in the form of, e.g., tuples of entities and relationships with each tuple representing entities that are related by the relationship. In aligning each sentence with a previously stored fact, entities in the sentence are identified first and used to search in the fact database 160 for a fact that contains the same entities. Such identified fact with the same entities as that identified in the sentence is aligned with the sentence.

This is illustrated in FIGS. 2A and 2B. In FIG. 2A, there are multiple exemplary sentences 200 and multiple facts (or representation of facts) 220. As seen, each of the sentences has entities. The first sentence "E1 was born in E2" has entities E1 and E2. For instance, E1 can be David Smith and E2 can be London. Similarly, the second sentence has entities E3 and E4; the third sentence has entities E5 and E6; and the fourth sentence has entities E7 and E8. In each of the sentences, the entities are related via some relationship. For example, E1 and E2 are related by "was born" or birthplace E5 and E6 are related by "went to school" or "schooling." Each of the facts 220 previously stored also has entities, which are related via some relationship. For example, E1 and E2 are related by relationship called "birthplace," etc.

To align each sentence with a previously stored fact, entities in each sentence are identified and if such identified entities in a sentence are found in a previously stored fact, the sentence is aligned with the fact. When there are multiple facts that have the same entities, the first one may be used for the alignment. Such a way to make alignment is to assume that as the sentence contains the same entities as that found in the fact, it is assumed that the entities in the sentence is related by the relationship that connected the same entities in the fact. Such generated alignments are clearly noisy because of the assumption that so long as the entities in the sentence and the fact are the same, they have the same relationship. This is shown in FIG. 2B, where the noisy alignments 230 are generated based on matched entities between sentences 200 and facts 220. For example, denoting "was born" using P1 and "birthplace" using R1, sentence 1 is aligned with fact 1 because they both have E1 and E2. This yields alignment (E1, E2, P1)-(E1, E2, R1). Similarly, because E3 and E4 both appear in sentence 2 and fact 2, this yields alignment (E3, E4, P1)-(E3, E4, R1). In the third sentence, P2 denotes "went to school" and the entities involved are E5 and E6. As fact 3 includes E5 and E6, the third sentence is aligned with the third fact, yielding "(E5, E6, P2)-(E5, E6, R1). This is an incorrect alignment because the relationship (birthplace) between E5 and E6 in the previously stored third fact does not match how E5 and E6 are related in the third sentence (went school). Thus, such generated alignments are noisy.

Because such automatically generated alignments are noisy, they need to be further processed in order to yield meaningful training data. The traditional approach is to use a manual process 170 to manually select proper alignments, from the noisy alignments, to generate proper training data in the training data storage 180. Due to the manual selection process, this is a semi-automated process and hence, still inefficient and error prone. Thus, a more efficient way is needed to generate more reliable training data for generating a relationship identification model.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for generating a relationship identification model. Sentences are received as input. Each of the sentences is aligned with a fact previously stored to create an alignment. Confidence scores for the alignments are computed and then used, together with the alignments to train a relationship identification model.

In a different example, a system for generating a relationship identification model is disclosed, which includes an alignment unit configured for receiving sentences as input and aligning each of the sentences with a representation of a fact previously stored to generate an alignment of the sentence, an alignment confidence determiner configured for computing a confidence score associated with the alignment, and a long-short term memory (LSTM)-based multi-encoder training unit configured for generating a relationship identification model based on alignments of the sentences and their associated confidence scores.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for generating a relationship identification model, wherein the medium, when read by the machine, causes the machine to perform a series of steps, including, receiving sentences as input, generating an alignment for each of the sentences with a fact previously stored. Confidence scores for the alignments are computed and then used, together with the alignments to train a relationship identification model.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to generate reliable training data. Particularly, the training data generated in accordance with the present teaching are for training a model for identifying relationship between or among entities in textual information. Alignments between sentences and previously stored facts are generated based on similarities between entities detected in such sentences and facts. Confidence scores for such noisy alignments are computed based on statistics observed in the alignments and used to characterize the reliabilities of the alignments. At the same time, sentences are analyzed to extract different features. The alignments, the confidence scores, as well as features detected from the sentences are used by a long short-term memory (LSTM) based multi-encoder to train a relationship identification model. Such trained relationship identification model is them used to recognize relationships existing in sentences.

Figure 3A:
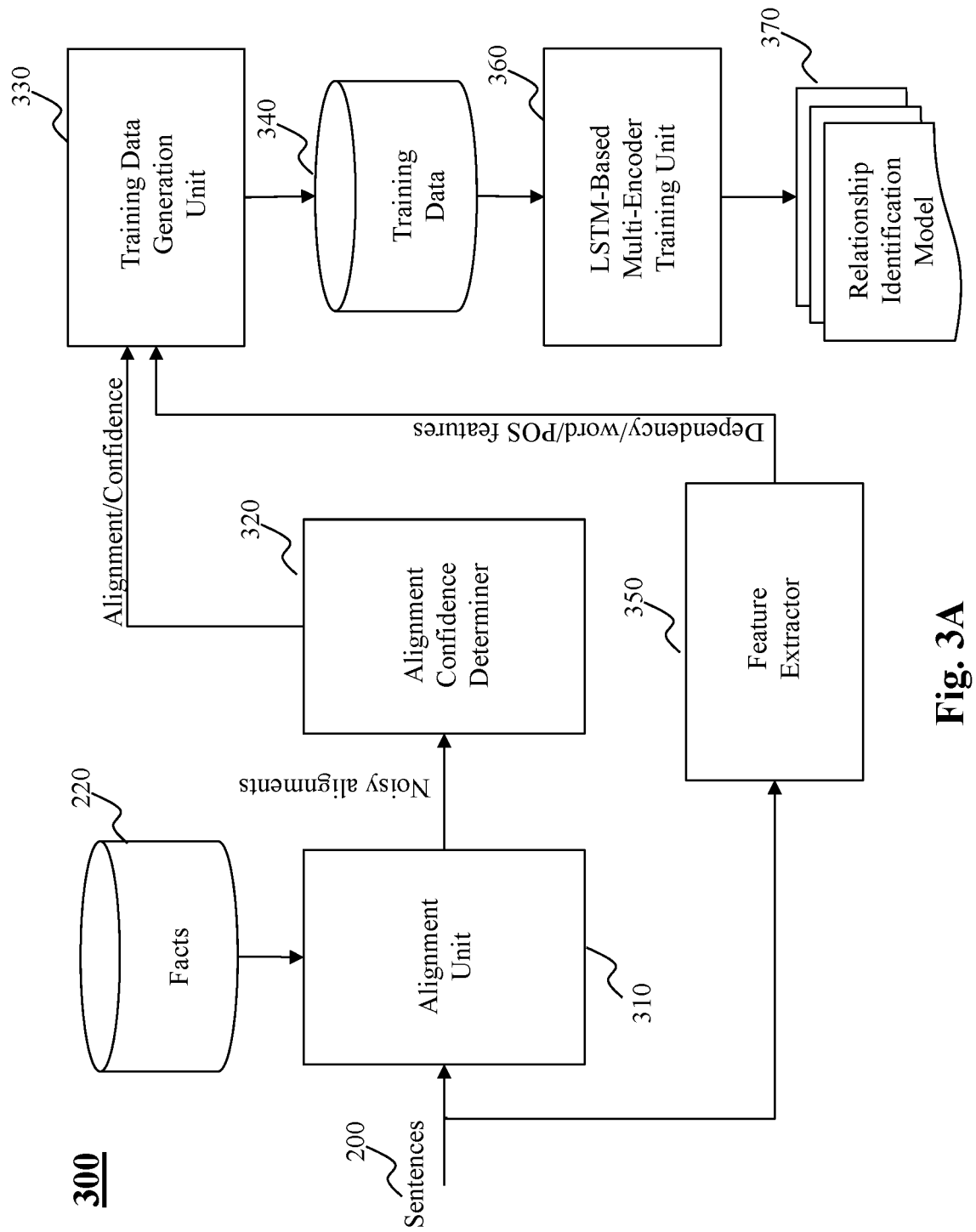
FIG. 3A depicts an exemplary high level diagram of a system for generating a relationship identification model trained using automatically generated training data, according to an embodiment of the present teaching.

FIG. 3A depicts an exemplary high level diagram of a system 300 for generating a relationship identification model trained using automatically generated training data, according to an embodiment of the present teaching. In this exemplary embodiment, the system 300 comprises an alignment unit 310, an alignment confidence determiner 320, a feature extractor 350, a training data generation unit 330, and an LSTM-based multi-encoder training unit 360. In operation, the alignment unit 310 takes sentences 200 as input and aligns the sentences with facts 220 previously stored in a storage. This generates noise alignments and such noisy alignments are then processed by the alignment confidence determiner 320 that produces alignment/confidence score pairs. The confidence scores associated with the alignments is used in selecting reliable alignments. Details about estimating the confidence of each of the noisy alignments are provided with reference to FIGS. 4A and 4B.

As discussed herein, identification of reliable alignments is to use the reliable alignments to train a relationship identification model. The conventional approach uses manual means to identify reliable alignments and this can be tedious, time consuming, costly, and inefficient. In accordance with the present teaching, the identification of reliable alignments is achieved via a confidence score computed for each of the noisy alignments. The alignments that have higher confidence scores correspond to more reliable alignments, while alignments with low confidence scores correspond to unreliable alignments. Instead of removing unreliable or bad alignments as bad training data, all alignments are to be used for training but the confidence scores of the noisy alignments are utilized during the training so that the unreliable alignments carry low or no weight and reliable alignments with high confidence scores are considered more heavily in training.

In the system 300, the alignments with confidence scores generated by the alignment confidence determiner 320 are used by the training data generation unit 330, which also takes as input various features extracted from sentences and incorporate as part of the training data. To identify features of the input sentences, the input sentences are processed by the feature extractor 350 to extract various features. In some embodiments, features extracted include dependency features, word features, and Part-of-Speech (POS) features. The features extracted are those that are considered to be pertinent to identifying relationships. Details related to the feature extractor 350 are provided with reference to FIGS. 5-7.

Once the alignments with confidence scores as well as features extracted from input sentences are received, the training data generation unit 330 generates training data and stores them in database 340. For example, each alignment may be associated with its confidence score as well as the features of the underlying sentence. Such stored training data are then used by the LSTM-based multi-encoder training unit 360 to train the relationship identification model 370. Details related to the LSTM-based multi-encoder training unit to train the relationship identification model 370 are provided with reference to FIGS. 8-9.

Figure 3B:
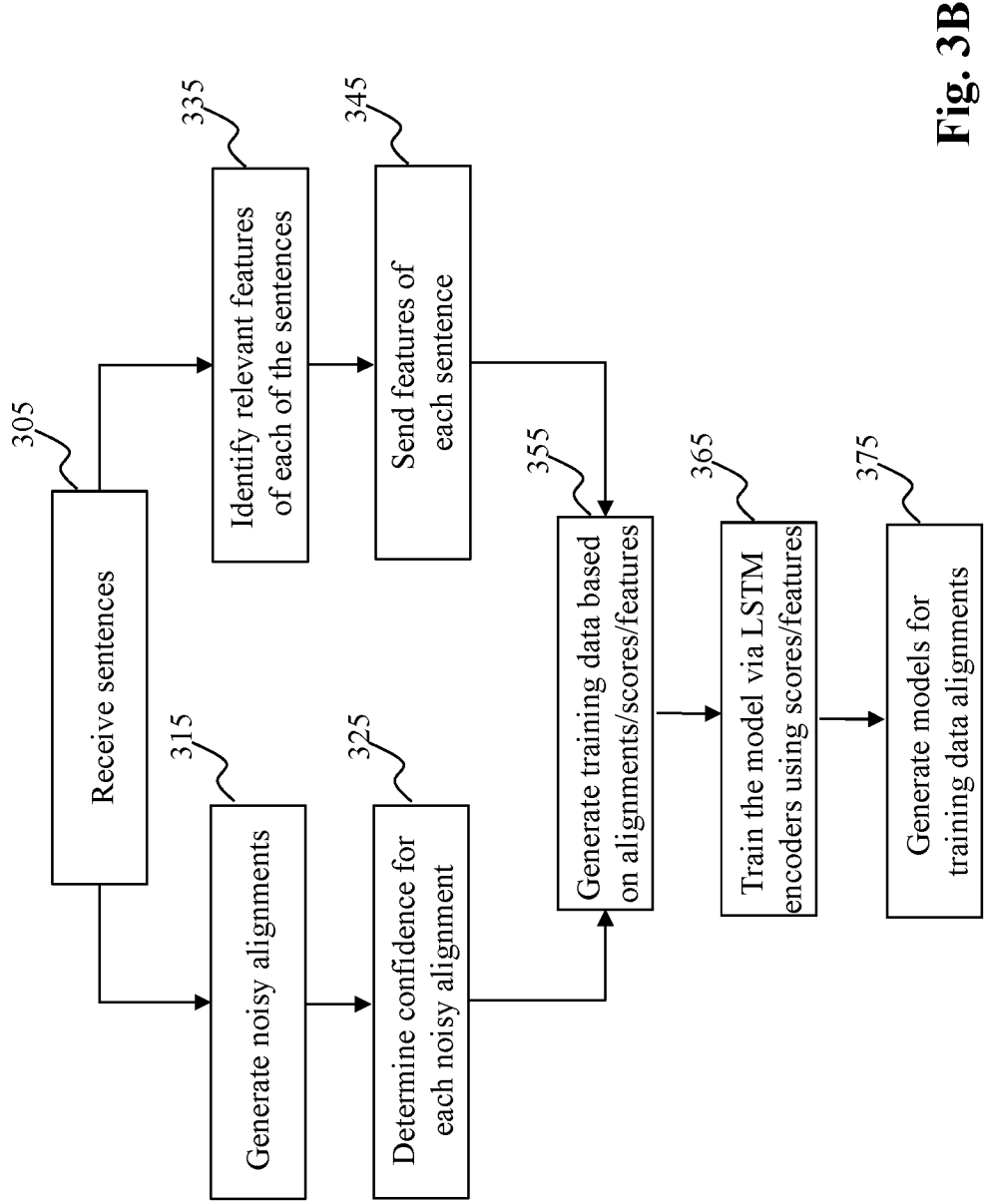
FIG. 3B is a flowchart of an exemplary process of generating a relationship identification model based on automatically generated training data, according to an embodiment of the present teaching.

FIG. 3B is a flowchart of an exemplary process of system 300 to generate a relationship identification model based on automatically generated training data, according to an embodiment of the present teaching. Upon receiving, at 305, input sentences by the alignment unit 310, noisy alignments are generated at 315. For each of the noisy alignments, the alignment confidence determiner 320 determines, at 325, a confidence score for the alignment. At the same time, with respect to each of the input sentences received, the feature extractor 350 identifies, at 335, various relevant features associated therewith and sends, at 345, such identified features to the training data generation unit 330. The training data generation unit 330 then generates, at 355, the training data based on the received alignments, confidence scores, and the features associated with the underlying sentences.

Based on such generated training data, the LSTM-based multi-encoder training unit 360 trains, at 365, the relationship identification model 370 based on the alignments, the confidence scores associated with the alignments, and the features extracted from the sentences. The training may be an iterative process with adjustments to various model parameters until certain criteria are met to generate, at 375, the relationship identification model 370.

Figure 4A:
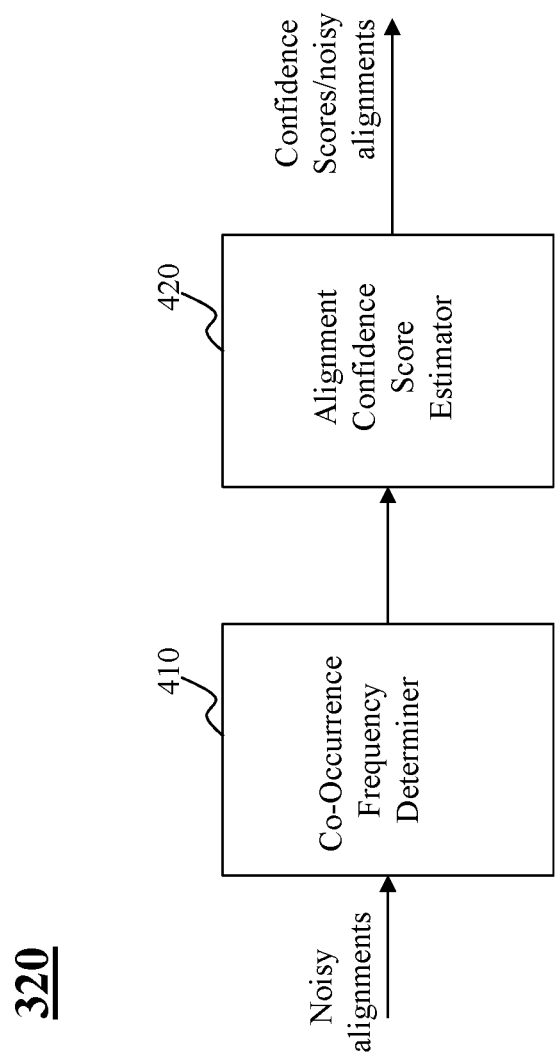
FIG. 4A depicts an exemplary system diagram of an alignment confidence estimator, according to an embodiment of the present teaching.

FIG. 4A depicts an exemplary system diagram of the alignment confidence determiner 320, according to an embodiment of the present teaching. According to the present teaching, the alignment confidence determiner 320 receives the noisy alignments created by the alignment unit 310 and then determines the confidence score for each of the noisy alignments. In some embodiments, a confidence score for an alignment is computed based on some statistics observed in the noisy alignments.

Figure 1A:
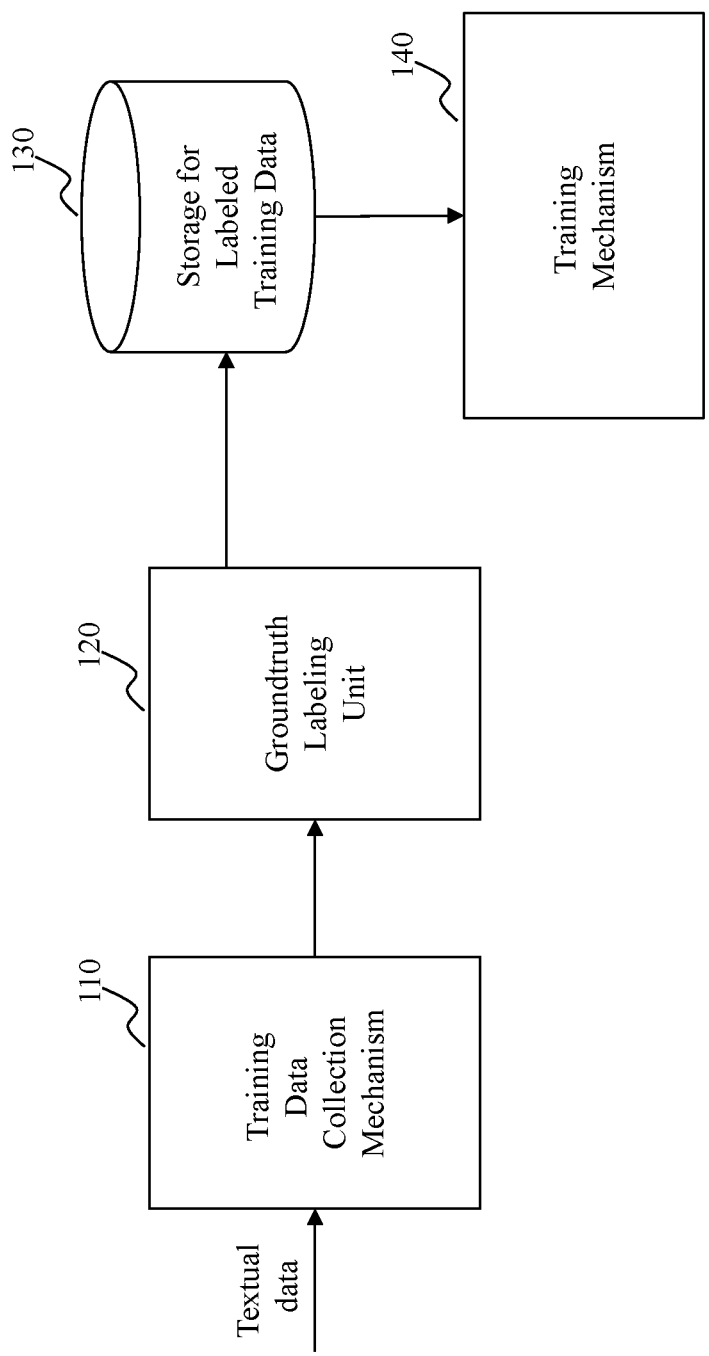
FIG. 1A (PRIOR ART) provides a conventional manual scheme of generating training data for creating a model for relationship identification.
Figure 1B:
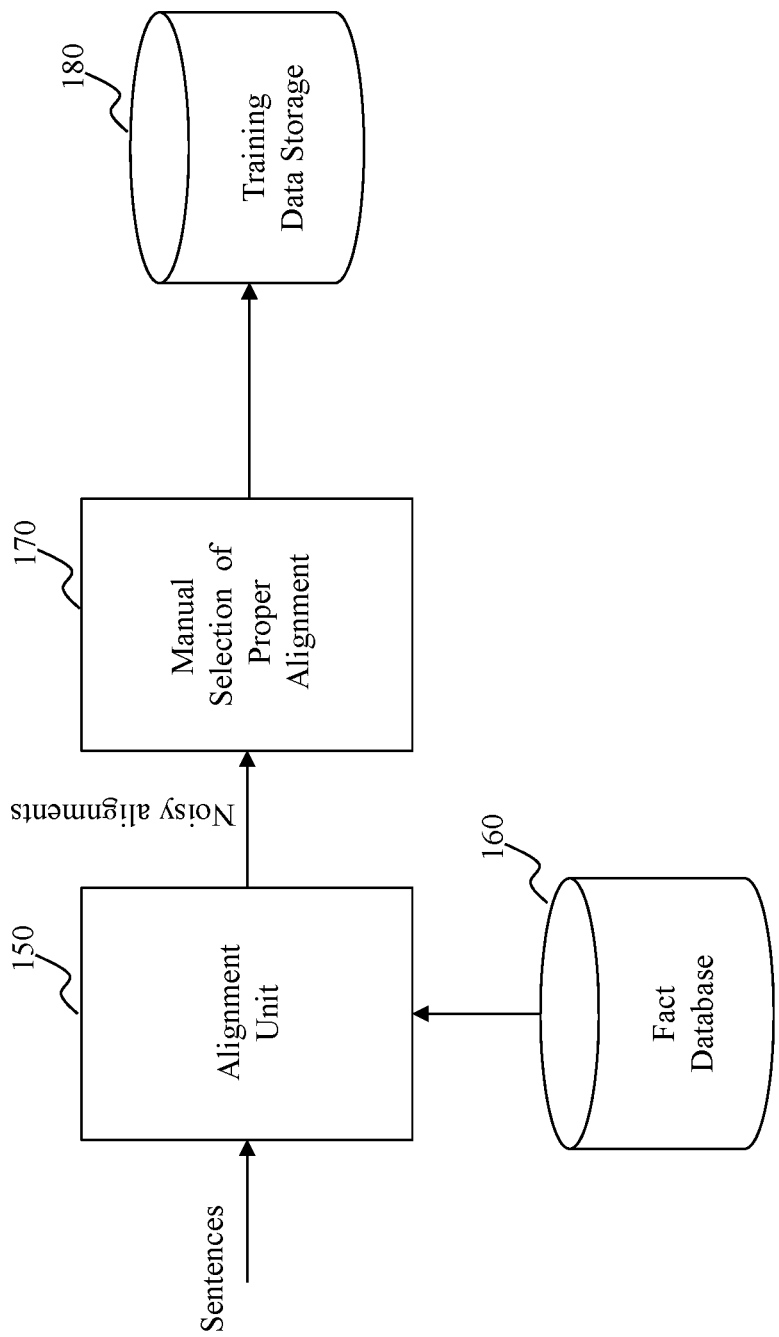
FIG. 1B (PRIOR ART) provides a semi-automated scheme of generating training data for creating a model for relationship identification.
Figure 2A:
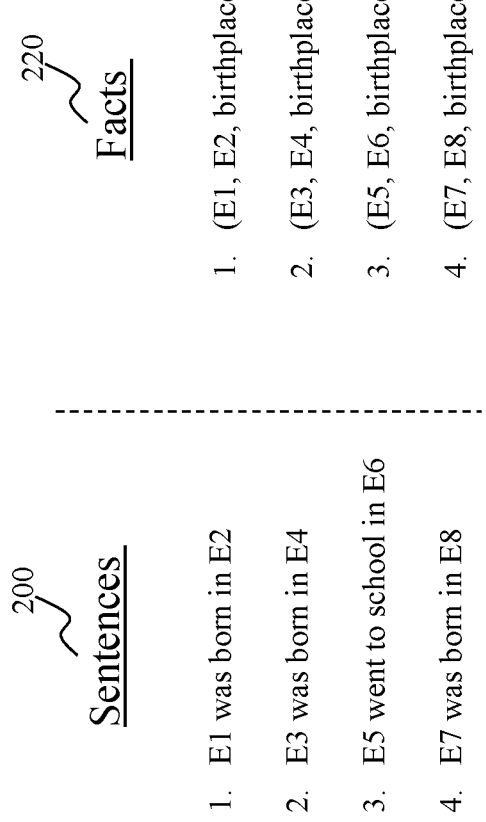
FIG. 2A provides examples of sentences and representations of previously stored facts.

Based on the example illustrated in FIG. 2A, the first sentence has a dependency pattern P1 that describes the grammatical nature due to the sequence of words "was born in." Similarly, the second and the fourth sentences also have the same sequence of words "was born in" or pattern P1. However, the third sentence has a different pattern P2 that corresponds to a sequence of words "went to school in." Based on entities appearing in each of the sentences, the alignments 230 are generated. It is clear that the third alignment (E5, E6, P2)-(E5, E6, R1) is incorrect, where R1 represents relationship "Birthplace."

In accordance with the present teaching, a confidence score is to be assigned to each of the noisy alignments. In some embodiments, the confidence score for each of the alignments as shown in FIG. 230 is computed based on the probability of a relation R given a specific dependency pattern $Dep_{elem}$, determined based on co-occurrence frequency between relation R and pattern P in the alignments. For example, if a specific R and a specific P co-occur in a large percentage of all alignments, more likely that the alignments that align the specific R and P have a higher reliability. Conversely, if a specific R and a specific P rarely co-occur or co-occur in a low percentage of all alignments, the reliability of the alignments that contain the specific R and P likely will be low.

Figure 2B:
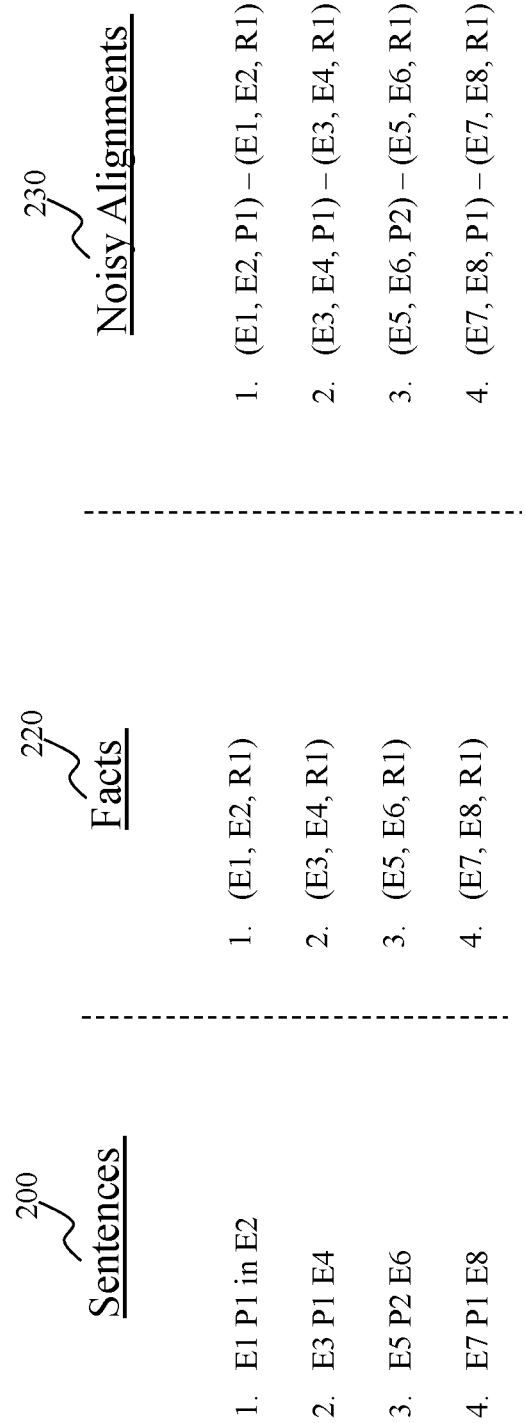
FIG. 2B provides example noisy alignments between illustrated sentences and previously stored facts.

An exemplary formulation to compute the probability is provided as: $p(R|Dep_{elem})$=Freq (R, $Dep_{elem}$)/Freq ($Dep_{elem}$), where R denotes a relationship, Freq (R, $Dep_{elem}$) denotes the co-occurrence frequency of relation R and pattern $Dep_{elem}$, i.e., the number of sentences where dependency $Dep_{elem}$ exists between two entities via relation R. Taking the example illustrated in FIG. 2B, where there are a total of 4 noisy alignments. Of those 4 noisy alignments, for R1 and P1, there are 3 out of 4 alignments involving R1 and P1. There is one alignment involves R1 and P2 and there is only one instance that aligns R1 to P2. Given that, the probabilities or confidence scores for each of the noisy alignments for this illustrative example are p(R1|P1)=3/4=0.75 and P(R1|P2)=1/4=0.25, where R1 is "Birthplace," P1 is "was born in," and P2 is "went to school in."

Figure 4B:
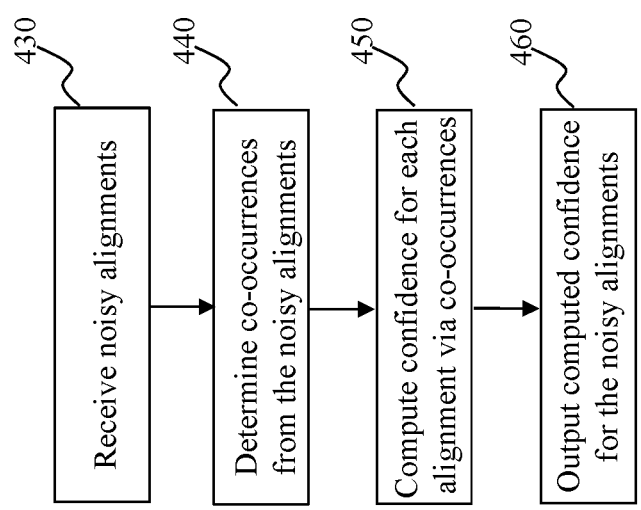
FIG. 4B is a flowchart of an exemplary process for an alignment confidence estimator, according to an embodiment of the present teaching.

As shown in FIG. 4A, the alignment confidence determiner 320 comprises a co-occurrence frequency determiner 410 and an alignment confidence score estimator 420. FIG. 4B is a flowchart of an exemplary process for the alignment confidence estimator, according to an embodiment of the present teaching. The co-occurrence frequency determiner 410 receives, at 430, noisy alignments (from the alignment unit 310) and proceeds to determine, at 440, the co-occurrence frequencies from the input noisy alignments. Based on the co-occurrence frequencies, the alignment confidence score estimator 420 estimates, at 450, the probability or confidence score for each of the noisy alignments. The estimated confidence scores and the noisy alignments are then output, at 460, to the training data generation unit 330, where the training data are to be generated based on not only the alignments and the confidence scores but also additional features extracted from sentences.

With the noisy alignments having confidence scores associated therewith, when such alignments are used as training data, the confidence scores are used to impact how the learning is to be conducted based on such confidence scores. Instead of manually picking out the alignments that likely constitute noise, via confidence scores and a mechanism that is capable of relying on confidence scores to dynamically determine how each alignment will impact the learning allows the system to be more efficient without sacrificing quality.

In using the noisy alignments with confidence scores for the training, the LSTM-based multi-encoder training unit 360 is configured to take both the alignments and the confidence scores as input and accordingly training the relationship identification model 370 based on the confidence scores. For example, if an alignment has a higher confidence score, it may create a greater impact in modifying the learning model parameters than another alignment that has a lower confidence score. As will be disclosed herein, the LSTM-based multi-encoder training unit 360 also receives various features extracted from the sentences as input and use them in the training process. Details related to the LSTM-based multi-encoder 360 will be provided with reference to FIGS. 8-9.

Figure 5:
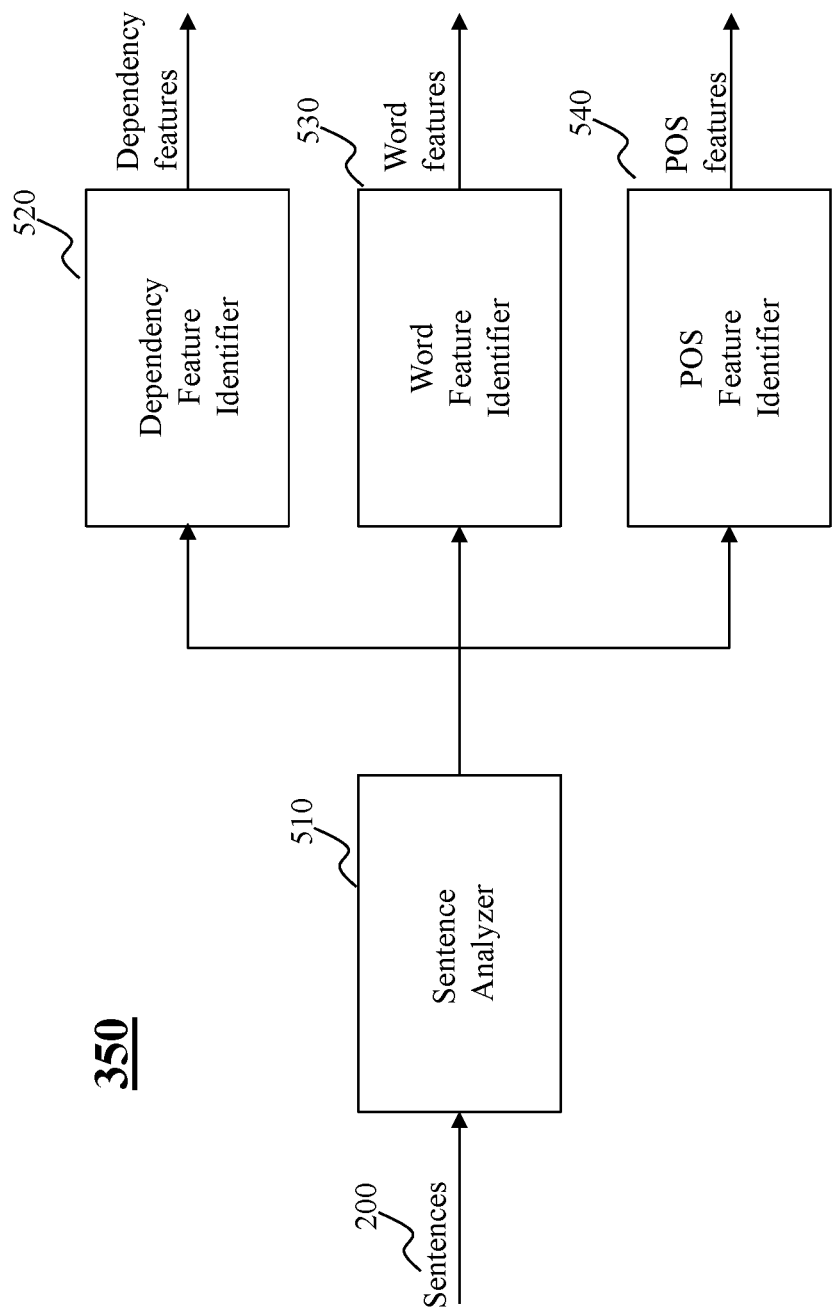
FIG. 5 depicts an exemplary system diagram of a feature extractor, according to an embodiment of the present teaching.
Figure 6:
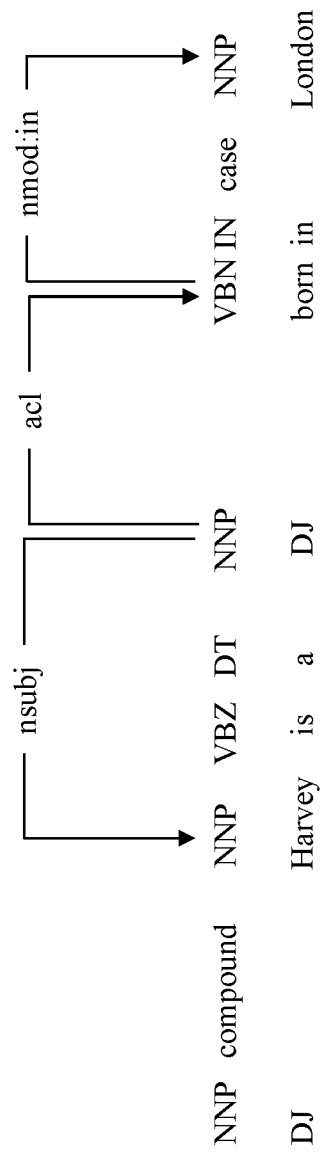
FIG. 6 illustrates an exemplary sentence with linguistic processing results, according to an embodiment of the present teaching.

FIG. 5 depicts an exemplary system diagram of the feature extractor 350, according to an embodiment of the present teaching. According to the present teaching, various features are extracted from sentences and will be used in training. Such features may be pertinent to identifying relationships. In some embodiments, exemplary three different types of features are used, including dependency features, word features, and part-of-speech (POS) features. Dependency features include dependency elements identified when a sentence is parsed. For example, for sentence "D J Harvey is a DJ born in London, England.", it may be parsed to create the dependency graph as shown in FIG. 6. Based on this dependency graph, different dependency elements may be identified. For instance, examples of dependency elements may includes 1. Root node (e.g., word DJ)
2. Path to the first entity e1 [<1-nsubj>]
3. Path to the second entity e2 [<r-acl>→born→<r-nmod:in>]

A sequence of dependency features may be combined, e.g., by concatenating the path to the first entity e1, the root word, and the path to the second entity e2, etc.

Another type of exemplary features that may be extracted from sentences for training is word features. For instance, a sequence of words between the entities detected from a sentence may be identified and used in training. In some embodiments, an embedding layer may be used for converting raw word indices to distributed representations.

Yet another exemplary type of features extracted from sentences for training is POS features. POS features may correspond to tags that identify type of words being tagged. Specifically, a sequence of POS tags for words between the entities detected from a sentence may be used as part of the training data.

Figure 7:
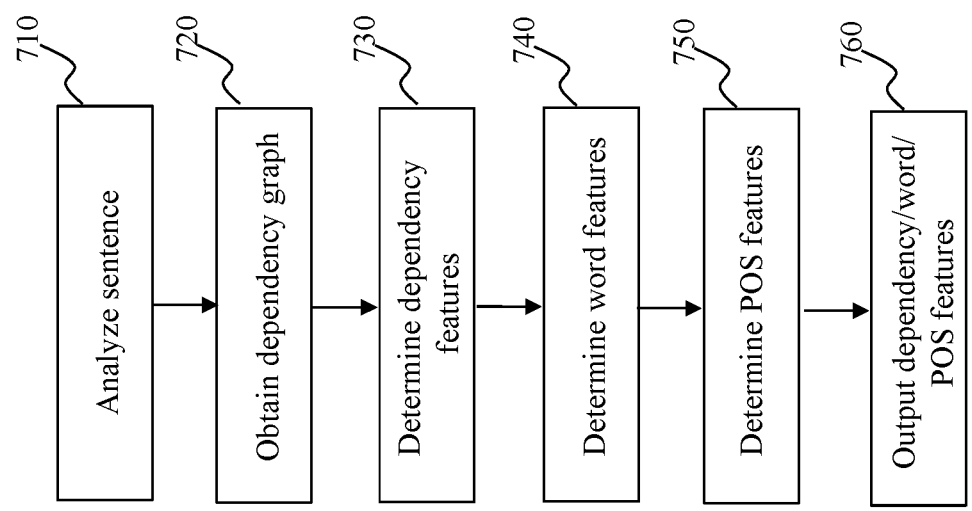
FIG. 7 is a flowchart of an exemplary process of a feature extractor, according to an embodiment of the present teaching.

In some embodiments, the feature extractor 350 comprises a sentence analyzer 510, a dependency feature identifier 520, a word feature identifier 530, and a POS feature identifier 540. FIG. 7 is a flowchart of an exemplary process of the feature extractor 350, according to an embodiment of the present teaching. Upon receiving sentences, the sentence analyzer 510 analyzes, at 710, each of the sentences and obtains information needed for determining various features. For instance, the sentence analyzer 510 may obtain, at 720, a dependency graph for each of the sentences. Based on the output from the sentence analyzer 510, the dependency feature identifier 520, the word feature identifier 530, and the POS feature identifier 540, extract features, respectively. Specifically, the dependency feature identifier 520 obtains, at 730, various dependency features as described herein based on, e.g., the dependency graph for each of the sentences. In addition, the word feature identifier 530 processes the sentences and determines, at 740, word related features. Similarly, the POS feature identifier 540 determines, at 750, POS features for each of the sentences. Such identified features are then output, at 760, to the training data generation unit 330 to be combined with the alignments and confidence scores.

As depicted in FIG. 3A, the alignments with confidence scores as well as features extracted from sentences are sent, by the alignment confidence determiner 320 and the feature extractor 350 respectively, to the training data generation unit 330. Upon receiving such information related to the sentences, the training data generation unit 330 may generate the training data for training the relationship identification model 370 by, e.g., organizing the received information in a meaningful manner and stores such generated training data in the storage 340. For example, each of the noisy alignments may be stored with its confidence score and the features extracted from the underlying sentence to form a piece of training data.

Figure 8:
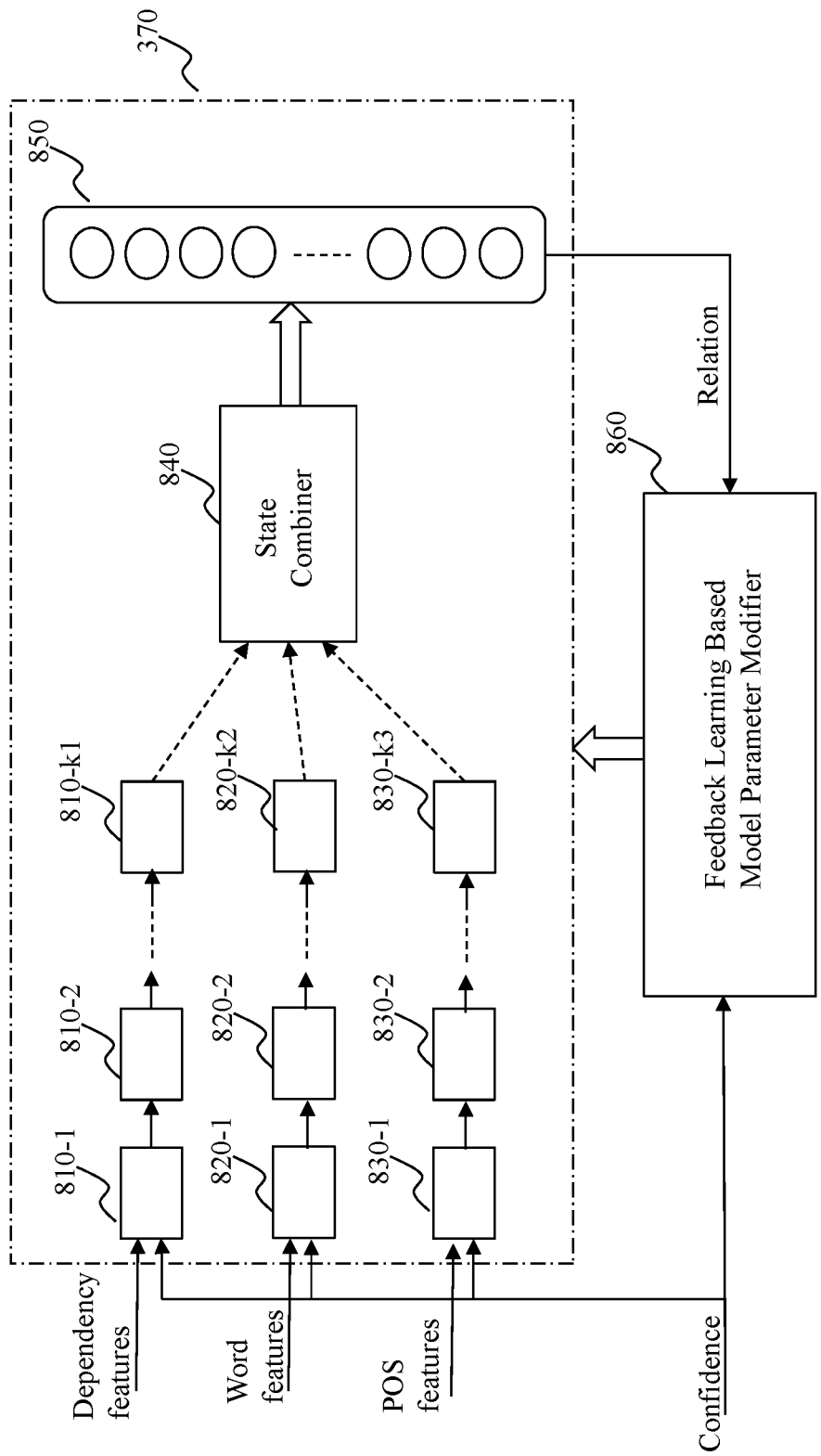
FIG. 8 depicts an exemplary system diagram of an LSTM-based multi-encoder training unit for training a relationship identification model, according to an embodiment of the present teaching.

The training data may then be utilized by the LSTM-based multi-encoder training unit 360 to train the relationship identification model 370. FIG. 8 depicts an exemplary system diagram for learning the relationship identification model 370, according to an embodiment of the present teaching. According to one embodiment of the present teaching, a neural network architecture may be adopted for the relationship identification model 370 and the parameters related to the model may be modified during the training. A trained relationship identification model 370 may be one with parameters adjusted during training and can be used to detect relationships from text when input text information and its features are provided. In one embodiment, an LSTM-based multi-encoder training unit 360 predicts relations from text in accordance with the present teaching. Specifically, as can be seen from FIG. 8, a plurality of encoders may be employed to encode information embedded in different feature sequences.

In some embodiment of the present teaching, a recurrent neural network (RNN) may be adopted with long-short memory units (LSTMs) applied to consecutively process and sequentially input features. More specifically, in some embodiments, bidirectional LSTM cells may be used to achieve enhanced performance as compared with regular LSTM cells. As seen in FIG. 8, the learning scheme comprises the relationship identification model 370 and a feedback learning based model parameter modifier 860, in which the features of sentences as well as confidence scores are fed into the model 370 and the output of the model being trained are fed into the feedback learning based model parameter modifier 860 that adjusts the model parameters according to the feedback until the model produces intended output.

In this illustrated embodiment, the relationship identification model 370 has an architecture having multiple encoders, each of which is an RNN with a sequentially arranged LSTM cell units with a first cell unit and a final cell unit. The first cell unit is one that takes a sequence of features in an order and the last cell unit is one that produces an output for the encoder. For example, the illustrated embodiment has a first LSTM-based encoder comprising cell units 810-1, 810-2, . . . , 810-$k1$, with cell unit 810-1 as the first cell unit and 810-$k$ as the final cell unit. In this embodiment, the first LSTM-based encoder takes as input the confidence score of the alignment associated with the sentence and a sequence of dependency features of the underlying sentence that are sequentially fed into the encoder. The final cell unit 810-$k$ produces an output of the first LSTM-based encoder determined based on dependency features.

Similarly, a second LSTM-based encoder comprises 820-1, 820-2, . . . , 820-$k2$ with 820-1 as the first input cell unit and 820-$k2$ as the final cell unit. The confidence score of an alignment as well as a sequence of word features of the underlying sentence of the alignment are provided in sequence to the second LSTM-based encoder and the final cell unit 820-$k2$ produces an output of the second LSTM-based encoder based on word related features. The confidence score and the POS features are also fed in sequence into the third LSTM-based encoder comprising cell units 830-1, 830-2, . . . , 830-$k3$ and the final cell unit 830-$k3$ produces an output determined based on POS features. Although it is illustrated to use three exemplary types of features, the present teaching is not limited to the specific number of or particular examples disclosed. Any features that may be pertinent to relationship identification may be utilized in training via LSTM-based multi-encoders.

According to the illustrated embodiment of the present teaching, the final cell states of the LSTM-based encoders may be combined to create a combined cell state. In some embodiments, the combination may be achieved via concatenation. For example, if $C1, C2, \ldots, Cm$ represent the final cell state from m LSTM-based encoders, respectively, a combined state C may be obtained by concatenating the m cell states to generate $C=[C1, C2, \ldots, Cm]$ as the output of the LSTM-based multi-encoder. This is performed by the state combiner 840 in FIG. 8.

In some embodiments, the number of feature elements in each feature sequence may be appropriately restricted to a certain maximum number of elements. Sequence features that are closer to the entities detected in a sentence have been found to be more important for determining relationships. Thus, if a sequence is longer than the maximum number of elements, certain truncation may be applied, e.g., using the first and the last K elements may to train the model. The final layer 850 may be a dense layer that is the layer that serves to predict a relationship represented in each node of the relationship layer 850. In some embodiments, a softmax activation function was used in the final dense layer for predicting the relations. In training the model, the confidence scores computed during the training data generation phase are provided to the multi-encoders, e.g., as sample weights when the model is trained using, e.g., a categorical cross-entropy loss function. In some embodiments, when the training data present imbalanced nature, balanced class weighting may be applied to avoid bias during the training.

When the states from different encoders are combined, the combined state is used to predict relationships existing in the textual information. During training, for each alignment (with sentence features and confidence score), there may be a predicted relation (e.g., one node at the layer 850 may be activated to signify that the relationship represented by the node exists in the sentence. The prediction may or may not be correct and is used to further and/or continually tune (or train) the model by modifying parameters associated with the model so that the model will eventually produce the expected output. The output of layer 850 may be provided to the feedback learning based model parameter modifier 860, which may then determine how to modify the model parameters based on not only the discrepancy observed but also the confidence score associated with the alignment. For example, as discussed herein, if the confidence score associated with a specific alignment is low, even though the feedback may be used to guide how to tune the model, the feedback learning based model parameter modifier 860 may decide that due to the low confidence, the modification may not proceed or with much reduced impact.

Parameters of the model that can be modified to make a learned model may include different types. For example, each cell unit may have different parameters that may be modified to change the behavior of the cell. The link between any two cell units may also have parameters that may be adjusted to change the behavior of the encoder. In addition, it is possible that the number of cell unit in each encoder may also be adjusted to enhance the performance. There may also be various parameters in the state combiner that can be adjusted during training to improve the prediction performance. As discussed herein, the modification to be applied to model parameters may be determined based on the confidence scores associated with the training data. When the confidence score is high, indicating that the training data carry more weight, any discrepancy or feedback yielded from such training data will lead to more significant modifications than those yielded from the training data with lower confidence scores. In this way, the impact of training data relies on the trustworthiness of the training data that is determined based on confidence score instead of requiring removal of bad training data as what is done conventionally. Hence, the present teaching enables training of a relationship identification model efficiently with quality.

Figure 9:
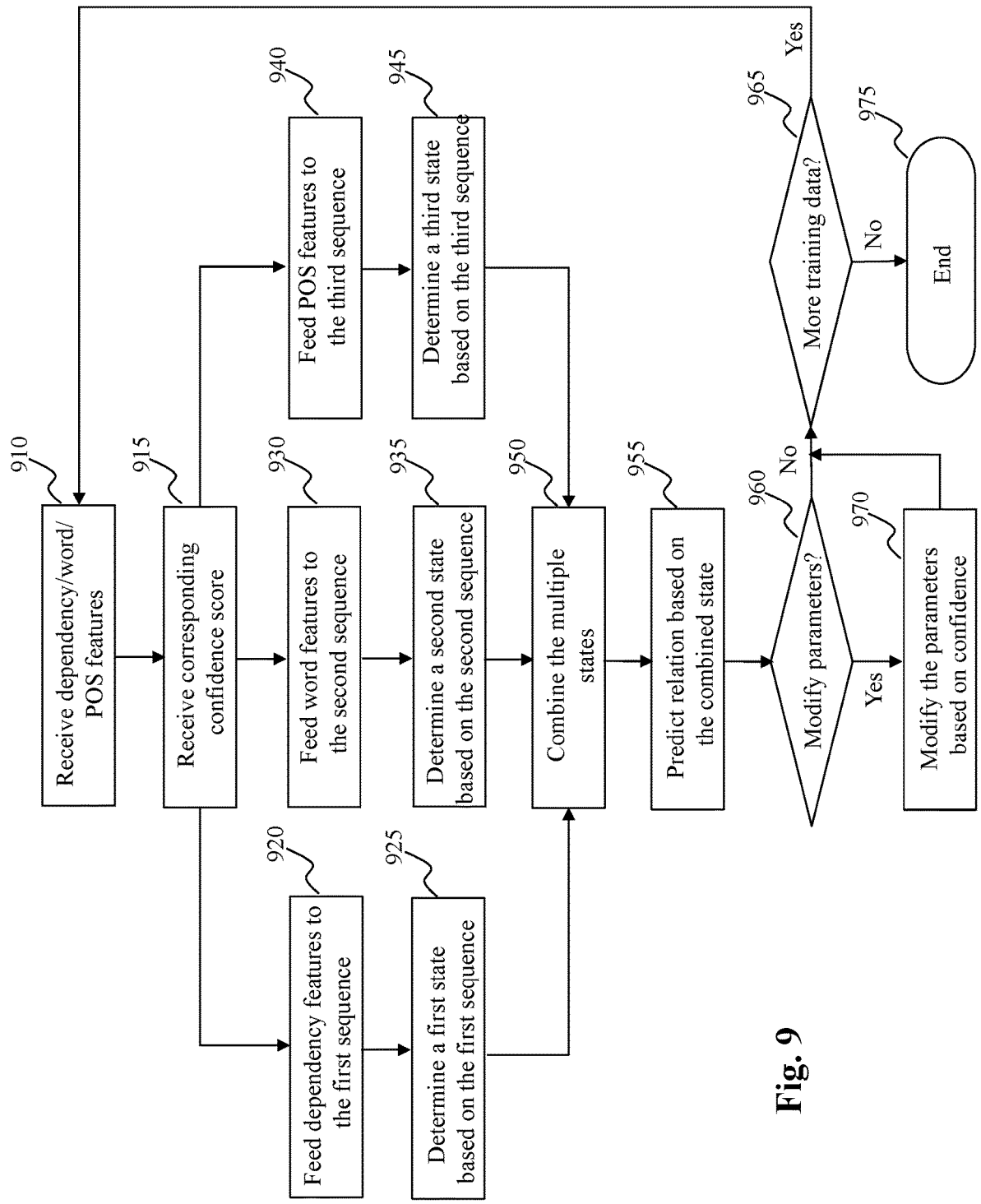
FIG. 9 is a flowchart of an exemplary process of training a relationship identification model via an LSTM-based multi-encoder training unit, according to an embodiment of the present teaching.

FIG. 9 is a flowchart of an exemplary process of training the relationship identification model 370 via the LSTM-based multi-encoder training unit 360, according to an embodiment of the present teaching. With respect to each of the training samples, confidence score and its corresponding multiple sequences of features are received first at 910 and 915, respectively. Each of the sequences of features is fed into a different LSTM-based encoder (810, 820, . . . , 830) in sequence. For example, the dependency features are provided in sequence to the first LSTM-based encoder 810 at 920. The word features are provided in sequence to the LSTM-based second encoder 820 at 930. The POS features are fed in sequence to the third LSTM-based encoder 830 at 940.

Upon receiving the sequence of input features in each LSTM-based encoder, it generates its corresponding output based on the current model parameters in that encoder. Specifically, the first LSTM-based encoder 810 determines, at 925, its encoder state based on the dependency features. The second LSTM-based encoder 820 determines, at 935, its encoder state based on the word features. Similarly, the third LSTM-based encoder 830 determines, at 945, its encoder state based on POS features. According to the present teaching, the output states from LSTM-based encoders are combined at 950 based on the present model parameters.

The combined state is then used to predict, at 955, the relationship existing in the sentence of the current training sample.

Based on the predicted training sample, discrepancy is determined between the predicted relationship and the actual known relationship indicated in the alignment. If the discrepancy warrants modification to the model parameters, determined at 960, the modification is carried out at 970 based on the confidence score. As discussed herein, if the confidence score is low, even when the discrepancy is big, the modification may not be performed or with a adjusted degree determined based on the confidence score. If the discrepancy is small and does not warrant to modify the model parameters, the process continues, determined at 965, when there are more training samples.

Figure 10:
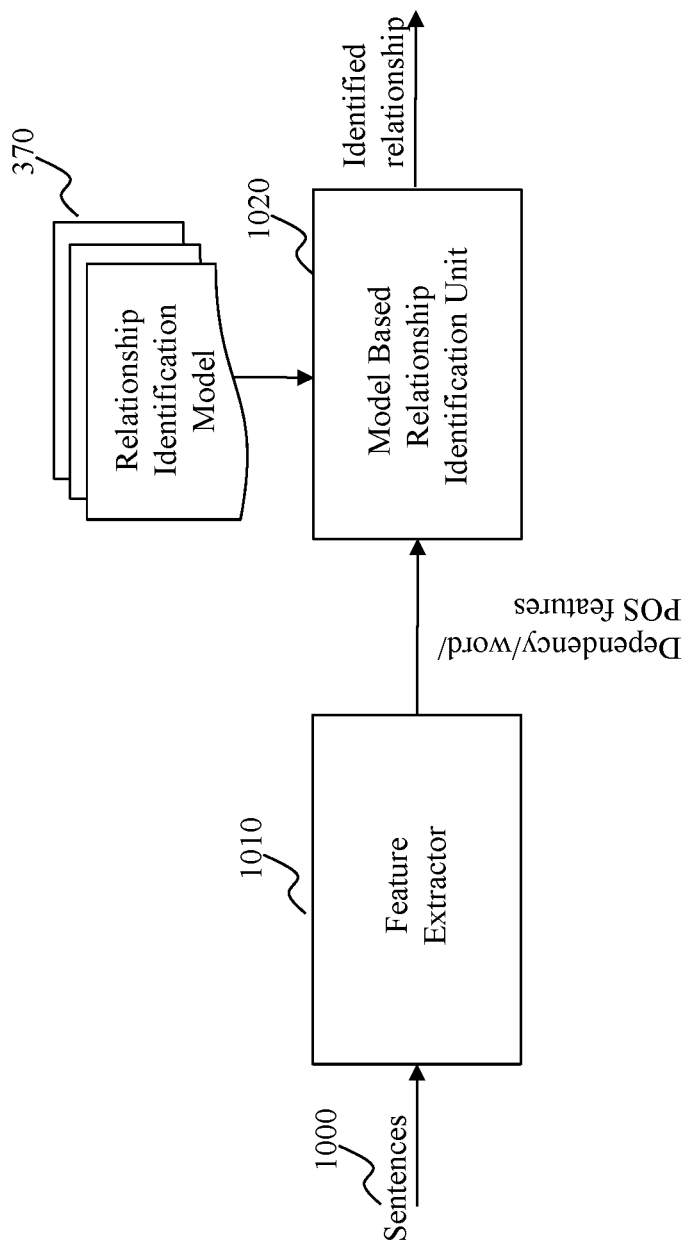
FIG. 10 depicts an exemplary system diagram for identifying a relationship from an input sentence based on a relationship identification model, according to an embodiment of the present teaching.

FIG. 10 depicts an exemplary system diagram of a mechanism for identifying a relationship in an input sentence based on the relationship identification model 370, according to an embodiment of the present teaching. In this illustrated embodiment, it comprises a feature extractor 1010 and a model based relationship identification unit 1020. Upon receiving an input sentence 1000, the feature extractor 1010 may process the input sentence and identify various features associated with the sentence, including, e.g., word features, dependency features, and POS features according to the discussion provided herein. Such extracted features of the input sentence is then sent to the model based relationship identification unit 1020, which is connected to the relationship identification model 370, obtained via the training as described herein. Different types of features may be input corresponding LSTM-based multi-encoders 810, 820, . . . , 830 so that the multi-encoders generate their corresponding outputs before the output are combined by the state combiner 840 to generate a combined output which is then used at 850 to activate a node that corresponds to the identified relationship. The multi-encoders and the state combiners are configured with model parameters obtained via training as disclosed herein. The model based relationship identification unit 1020 then generates an identified relationship of the input sentence based on the output from the relationship identification model 370.

Figure 11:
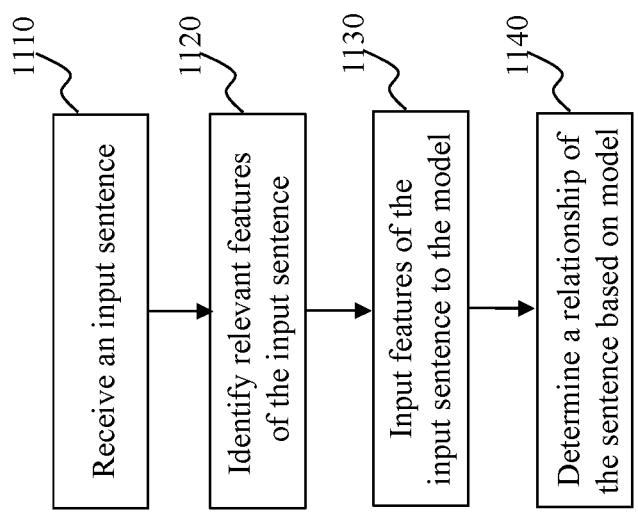
FIG. 11 is a flowchart of an exemplary process for identifying a relationship from an input sentence based on a relationship identification model, according to an embodiment of the present teaching.

FIG. 11 is a flowchart of an exemplary process of the mechanism depicted in FIG. 10, according to an embodiment of the present teaching. When an input sentence is received at 1110, various relevant features of the sentence is extracted from the input sentence at 1120. Such identified features of the input sentence are then input to the relationship identification model 370 at 1130. The output of the relationship identification model 370 obtained based on the features of the input sentence is then used to generate a relationship of the input sentence.

Figure 12:
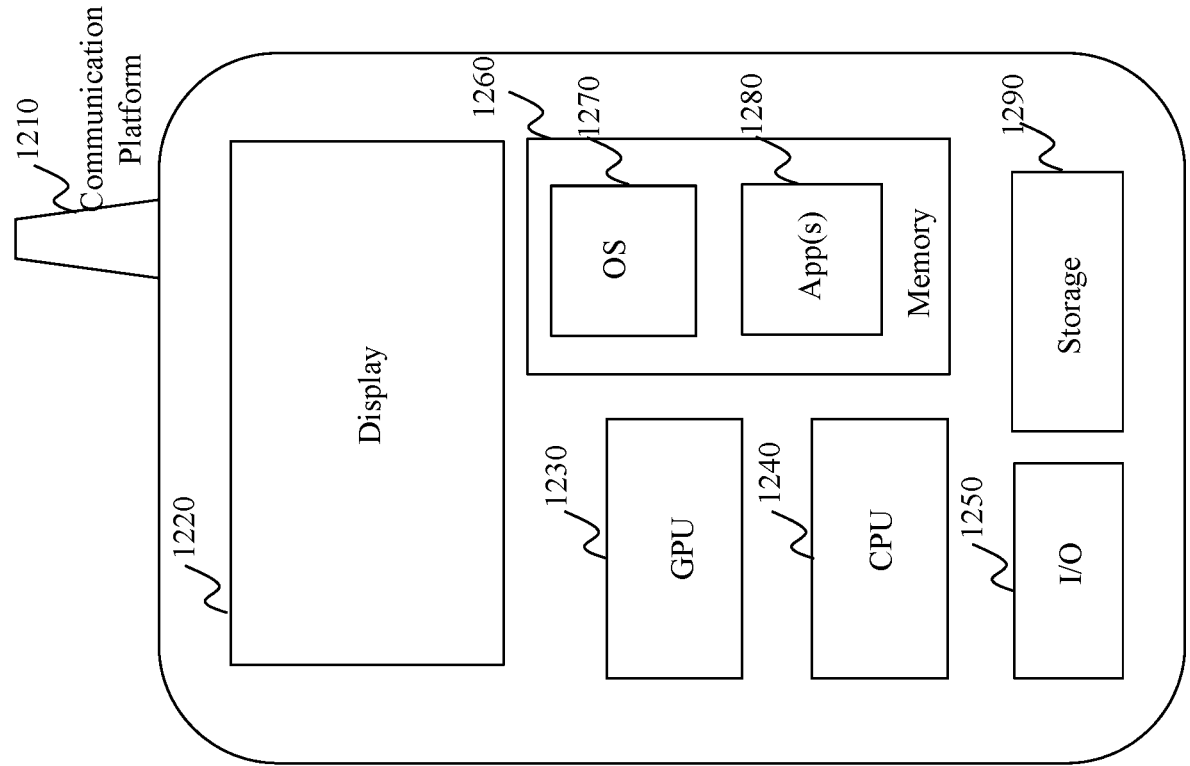
FIG. 12 depicts the architecture of a mobile device which can be used to implement a specialized system incorporating the present teaching.

FIG. 12 depicts the architecture of a mobile device which can be used to realize a specialized system implementing the present teaching. In this example, the user device on which content and advertisement are presented and interacted-with is a mobile device 1200, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1200 in this example includes one or more central processing units (CPUs) 1240, one or more graphic processing units (GPUs) 1230, a display 1220, a memory 1260, a communication platform 1210, such as a wireless communication module, storage 1290, and one or more input/output (I/O) devices 1250. Any other suitable component, including but not limited to a system bus or a controller (not shown), may also be included in the mobile device 1200. As shown in FIG. 12, a mobile operating system 1270, e.g., iOS, Android, Windows Phone, etc., and one or more applications 1280 may be loaded into the memory 1260 from the storage 1290 in order to be executed by the CPU 1240. The applications 1280 may include a browser or any other suitable mobile apps for receiving and rendering content streams and advertisements on the mobile device 1200. Communications with the mobile device 1200 may be achieved via the I/O devices 1250.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to query to ads matching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 13:
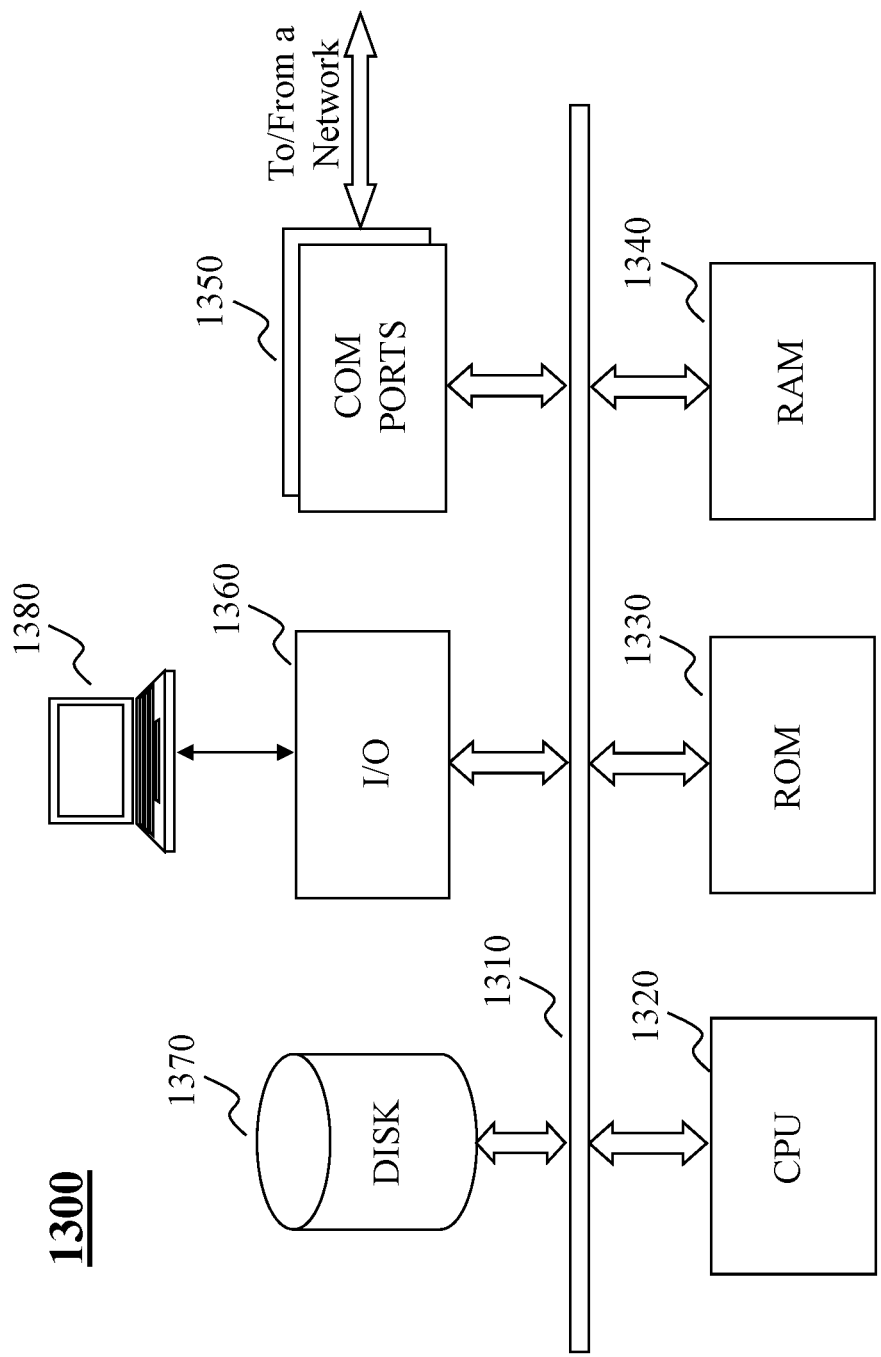
FIG. 13 depicts the architecture of a computer which can be used to implement a specialized system incorporating the present teaching.

FIG. 13 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1300 may be used to implement any component of the present teaching, as described herein. For example, the present teaching may be implemented on a computer such as computer 1300, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 1300, for example, includes COM ports 1350 connected to and from a network connected thereto to facilitate data communications. The computer 1300 also includes a central processing unit (CPU) 1320, in the form of one or more processors, for executing program instructions. The exemplary computer platform includes an internal communication bus 1310, program storage and data storage of different forms, e.g., disk 1370, read only memory (ROM) 1330, or random access memory (RAM) 1340, for various data files to be processed and/or communicated by the computer, as well as possibly program instructions to be executed by the CPU. The computer 1100 also includes an I/O component 1360, supporting input/output flows between the computer and other components therein such as user interface elements 1380. The computer 1300 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a machine having at least one processor, storage, and a communication platform for generating training data, comprising:
   receiving, via the communication platform, sentences as input;
   for each of the sentences,
      aligning the sentence with a representation of a fact previously stored to generate an alignment of the sentence with the fact, and
      computing a confidence score associated with the alignment; and
   generating, via a plurality of long-short term memory (LSTM)-based encoders, a relationship identification model based on alignments of the sentences and their associated confidence scores.

2. The method of claim 1, wherein the step of the aligning comprises:
   extracting a plurality of entities from the sentence;
   identifying the representation of a fact stored previously that has the plurality of entities; and
   creating the alignment between the sentence and the representation of the fact.

3. The method of claim 1, wherein the step of the computing comprises:
   determining a co-occurrence frequency associated with each of the alignments with respect to the alignments of the sentences; and
   determining the confidence score of the alignment based on the co-occurrence frequency.

4. The method of claim 1, further comprising:
   analyzing each of the sentences received; and
   obtaining a plurality types of features associated with each of the sentences, wherein
   the plurality types of features include at least one of dependency features, word features, and POS features associated with each of the sentences and are used in training the training data generation model.

5. The method of claim 4, wherein the step of the generating the relationship identification model comprises:
   receiving the plurality types of features associated with each of the sentences and the confidence score associated with each of the sentences;
   combining outputs from the plurality of LSTM encoders to generate a combined output for each of the sentences; and
   adjusting a plurality of parameters associated with the relationship identification model based on the combined outputs associated with the sentences.

6. The method of claim 1, further comprising:
   receiving an additional sentence;
   computing a plurality types of features associated with the additional sentence; and
   estimating a relationship expressed by the additional sentence based on the plurality of types of features and the relationship identification model.

7. The method of claim 6, wherein the step of estimating comprises:

providing each of the plurality types of features to each of LSTM-based multi-encoders associated with the relationship identification model;
obtaining a combined output based on outputs from the LSTM based multi-encoders generated based on the plurality of types of features; and
determining the relationship of the additional sentence based on the combined output.

8. A non-transitory computer readable medium including computer executable instructions wherein the instructions, when executed by a computer, cause the computer to perform:
receiving sentences as input;
for each of the sentences,
aligning the sentence with a representation of a fact previously stored to generate an alignment of the sentence with the fact, and
computing a confidence score associated with the alignment; and
generating, via a plurality of long-short term memory (LSTM)-based encoders, a relationship identification model based on alignments of the sentences and their associated confidence scores.

9. The medium of claim 8, wherein the step of the aligning comprises:
extracting a plurality of entities from the sentence;
identifying the representation of a fact stored previously that has the plurality of entities; and
creating the alignment between the sentence and the representation of the fact.

10. The medium of claim 8, wherein the step of the computing comprises:
determining a co-occurrence frequency associated with each of the alignments with respect to the alignments of the sentences; and
determining the confidence score of the alignment based on the co-occurrence frequency.

11. The medium of claim 8, wherein the information, when read by the machine, further causes the machine to perform the following:
analyzing each of the sentences received; and
obtaining a plurality types of features associated with each of the sentences, wherein
the plurality types of features include at least one of dependency features, word features, and POS features associated with each of the sentences and are used in training the training data generation model.

12. The medium of claim 11, wherein the step of the generating the relationship identification model comprises:
receiving the plurality types of features associated with each of the sentences and the confidence score associated with each of the sentences;
combining outputs from the plurality of LSTM encoders to generate a combined output for each of the sentences; and
adjusting a plurality of parameters associated with the relationship identification model based on the combined outputs associated with the sentences.

13. The medium of claim 8, wherein the information, when read by the machine, further causes the machine to perform the following:
receiving an additional sentence;
computing a plurality types of features associated with the additional sentence; and
estimating a relationship expressed by the additional sentence based on the plurality of types of features and the relationship identification model.

14. The medium of claim 13, wherein the step of estimating comprises:
providing each of the plurality types of features to each of LSTM-based multi-encoders associated with the relationship identification model;
obtaining a combined output based on outputs from the LSTM-based multi-encoders generated based on the plurality of types of features; and
determining the relationship of the additional sentence based on the combined output.

15. A system for generating training data, comprising:
an alignment unit configured for
receiving sentences as input, and
for each of the sentences, aligning the sentence with a representation of a fact previously stored to generate an alignment of the sentence with the fact;
an alignment confidence determiner configured for computing a confidence score associated with each alignment; and
a long-short term memory (LSTM)-based multi-encoder training unit configured for generating a relationship identification model based on alignments of the sentences and their associated confidence scores.

16. The system of claim 15, wherein the aligning unit is further configured for:
extracting a plurality of entities from the sentence;
identifying the representation of a fact stored previously that has the plurality of entities; and
creating the alignment between the sentence and the representation of the fact.

17. The system of claim 15, wherein the alignment confidence determiner comprises:
a co-occurrence frequency determiner configured for determining a co-occurrence frequency associated with each of the alignments with respect to the alignments of the sentences; and
an alignment confidence score determiner configured for determining the confidence score of the alignment based on the co-occurrence frequency.

18. The system of claim 15, further comprising a feature extractor configured for:
analyzing each of the sentences received; and
obtaining a plurality types of features associated with each of the sentences, wherein
the plurality types of features include at least one of dependency features, word features, and POS features associated with each of the sentences and are used in training the training data generation model.

19. The system of claim 18, wherein the LSTM-based multi-encoder training unit comprises:
a plurality of LSTM encoders configured for receiving the plurality types of features associated with each of the sentences and the confidence score associated with each of the sentences;
a state combiner configured for combining outputs from the plurality of LSTM encoders to generate a combined output for each of the sentences; and
a feedback learning based model parameter modifier configured for adjusting a plurality of parameters associated with the relationship identification model based on the combined outputs associated with the sentences.

20. The system of claim 15, wherein the information, when read by the machine, further causes the machine to perform the following:
receiving an additional sentence;
computing a plurality types of features associated with the additional sentence; and estimating a relationship expressed by the additional sentence based on the plurality of types of features and the relationship identification model.

\* \* \* \* \*